United States Patent [19]

Yumoto et al.

[11] Patent Number: 5,684,079
[45] Date of Patent: Nov. 4, 1997

[54] CURING COMPOSITION

[75] Inventors: Masanobu Yumoto; Tsutomu Imai; Hiromu Chano; Torao Higuchi; Yutaka Hashimoto; Masayuki Kamei, all of Osaka, Japan

[73] Assignee: Dainippon Ink and Chemicals Inc., Tokyo, Japan

[21] Appl. No.: 795,162

[22] Filed: Nov. 19, 1991

[30] Foreign Application Priority Data

Nov. 20, 1990 [JP] Japan .................................. 2-314639

[51] Int. Cl.[6] .................................................. C08K 3/20
[52] U.S. Cl. .................... 524/459; 524/430; 524/431; 524/432; 524/433; 524/460
[58] Field of Search .................................... 524/430, 431, 524/432, 433, 459, 460

[56] References Cited

U.S. PATENT DOCUMENTS

| | | | |
|---|---|---|---|
| 3,897,381 | 7/1975 | Tugukuni et al. | 524/555 |
| 4,181,645 | 1/1980 | Kinoshita | 523/455 |
| 4,269,869 | 5/1981 | Morohashi et al. | 526/266 |
| 4,358,477 | 11/1982 | Noomen et al. | 528/75 |
| 4,555,412 | 11/1985 | Gunter et al. | 523/402 |
| 4,593,068 | 6/1986 | Hirose et al. | 524/500 |
| 4,613,652 | 9/1986 | Nakayama et al. | 525/324 |
| 4,678,819 | 7/1987 | Sasaki et al. | 523/171 |
| 4,814,365 | 3/1989 | Takiyama et al. | 523/514 |
| 4,894,399 | 1/1990 | Rody et al. | 524/91 |

*Primary Examiner*—Edward J. Cain
*Attorney, Agent, or Firm*—Armstrong, Westerman, Hattori, McLeland & Naughton

[57] ABSTRACT

A curing composition for reinforcing an inorganic oxide material or a flawable base is disclosed. The composition comprises a curing compound emulsified and dispersed in water with or without the aid of an emulsifier or a water-soluble high polymer. The composition has excellent preservation stability and is free from the risk of fire or environmental pollution. The process for reinforcing an inorganic oxide material or a flawable base using the composition is also disclosed.

13 Claims, No Drawings

CURING COMPOSITION

FIELD OF THE INVENTION

This invention relates to a curing composition for reinforcing inorganic oxide materials and flawable bases.

BACKGROUND OF THE INVENTION

Inorganic oxide materials such as glass and ceramics are excellent materials having hardness and resistance to scratches, heat and chemicals but are, in turn, ready to be broken due to brittleness essential to these inorganic oxide materials. These materials suffer from breakage at an applied strength of $1/100$ to $1/1000$ of a theoretical strength because a breaking stress is centered at tips of fine cracks or scratches which occur during production, for example, during heat treatment.

JP-A-1-201047 (the term "JP-A" as used herein means an "unexamined published Japanese patent application") discloses a method for improving dynamic strength of glass, which comprises applying a curing composition comprising a curing compound and a silane coupling agent dissolved in an organic solvent on a glass base and curing the composition with active energy rays.

This curing composition, however, turned out to be poor in preservation stability. That is, when applied and cured after being allowed to stand for a long time, the composition does not exhibit the same level of dynamic strength as obtained in using the same composition immediately after preparation, failing to endowing glass with improved dynamic strength. Moreover, the composition has another disadvantage of causing fire or environmental pollution due to the organic solvent used therein.

JP-A-63-270702 discloses an active energy rays-curable composition free from the risk of fire or environmental pollution, but there is found no description about applicability to inorganic oxide materials.

SUMMARY OF THE INVENTION

The inventors have conducted extensive investigations in order to obtain a curing composition which, even after being allowed to stand for a long time, endows an inorganic oxide material with dynamic strength on the same level as exerted immediately after preparation. As a result, they have found that a curing composition comprising a curing compound emulsified and dispersed in water is excellent in meeting the purpose, thus completing the present invention.

The present invention relates to a curing composition for reinforcing an inorganic oxide material which comprises (I) a curing compound emulsified and dispersed in water.

DETAILED DESCRIPTION OF THE INVENTION

The terminology "curing compound" as used herein means a compound which cures through a chemical reaction, such as polymerization, condensation, polycondensation, and crosslinking (hereinafter referred to as curing compound (I)). Such a chemical reaction can be induced in any mode, for example, by application of heat, active energy rays, or humidity.

Examples of curing compound (I) include urea resins, melamine resins, phenol resins, isocyanato-containing compounds, silanol- or alkoxysilyl-containing compounds, epoxy-containing compounds, and compounds containing an $\alpha,\beta$-ethylenically unsaturated double bond. $\alpha,\beta$-Ethylenically unsaturated double bond-containing compounds are preferred in view of their rapid curing. Inter alia, compounds containing at least one acryloyl type group selected from the group consisting of an acryloyl group, a methacryloyl group, and a fluoroacryloyl group in the molecule thereof are preferred. The compound(s) containing such an acryloyl type group per molecule will hereinafter be simply referred to as an acrylate(s).

The term "acrylates" used in the art generally include those called polyfunctional acrylates and those called prepolymers, base resins, oligomers or acrylic oligomers. Specific examples of the acrylates are shown below.

(I-i) Polyfunctional (meth)acrylates (inclusive of acrylates and methacrylates, hereinafter the same) comprising a polyhydric alcohol having bonded thereto at least two molecules of $\alpha$-fluoroacrylic acid or (meth)acrylic acid (inclusive of acrylic acid and methacrylic acid, hereinafter the same)

(I-ii) Polyester acrylates comprising a polyester polyol, obtained by the reaction between a polyhydric alcohol and a polybasic acid, having bonded thereto at least two molecules of $\alpha$-fluoroacrylic acid or (meth)acrylic acid The polyhydric alcohols as referred to in (I-i) and (I-ii) include ethylene glycol, 1,4-butanediol, 1,6-hexanediol, diethylene glycol, trimethylolpropane, dipropylene glycol, polyethylene glycol, polypropylene glycol, pentaerythritol, dipentaerythritol, bisphenol A, and a compound of formula:

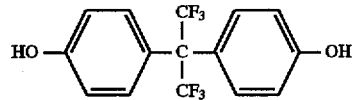

Also included in usable polyhydric alcohols are ethylene oxide- or propylene oxide-modified polyhydric alcohols obtained by addition of ethylene oxide or propylene oxide to the above-recited polyhydric alcohols.

The polybasic acids as above referred to include phthalic acid, adipic acid, maleic acid, trimellitic acid, itaconic acid, succinic acid, terephthalic acid, and an alkenylsuccinic acid.

(I-iii) Epoxy-modified acrylates comprising an epoxy compound containing at least two epoxy groups per molecule with the epoxy group thereof being converted to an acryloyl type functional group by esterification with $\alpha$-fluoroacrylic acid or (meth)acrylic acid Examples of the epoxy compounds having at least two epoxy groups per molecule include bisphenol A-epichlorohydrin type resins, phenol novolak-epichlorohydrin type resins, and polyhydric alcohol epichlorohydrin type alicyclic resins.

(I-iv) Polyurethane acrylates obtained by reacting a polyisocyanate compound with a hydroxyl-containing $\alpha$-fluoroacrylate or a hydroxy-containing (meth)acrylate The polyisocyanate compounds include compounds having a skeleton of polyester, polyether, polyurethane, etc. with an isocyanato group bonded at both terminals thereof.

(I-v) Polyether $\alpha$-fluoroacrylate, polyether (meth)acrylate, melamine $\alpha$-fluoroacrylate, melamine (meth)acrylate, alkyd $\alpha$-fluoroacrylate, alkyd (meth)acrylate, isocyanurate $\alpha$-fluoroacrylate, isocyanurate (meth)acrylate, silicon $\alpha$-fluoroacrylate, and silicon (meth)acrylate (I-vi) Compounds having one fluoroalkyl group or (meth)acryloyl group in the molecule thereof Of the above-mentioned curing compounds having at least two α-fluoroacryloyl groups or (meth)acryloyl groups per molecule, particularly preferred are those represented by formulae (a) to (j) shown below for obtaining effective improvement in dynamic strength of inorganic oxide materials.

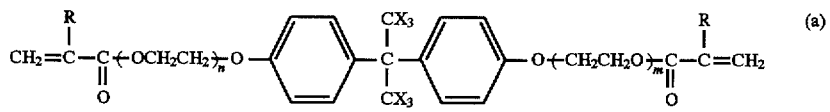
(a)

wherein R represents a hydrogen atom, a fluorine atom, or a methyl group; n and m, which may be the same or different, each represents an integer satisfying the relationship of $2 \leq n+m \leq 10$; and X represents a hydrogen atom or a fluorine atom.

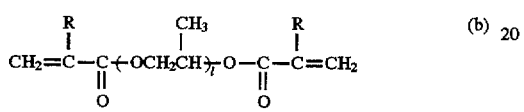
(b)

wherein R is as defined above; and l represents an integer of from 1 to 10.

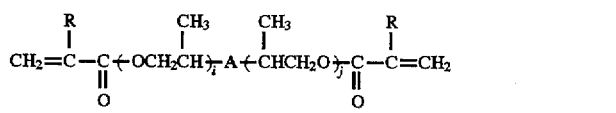
(c)

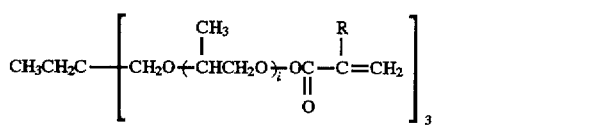
(d)

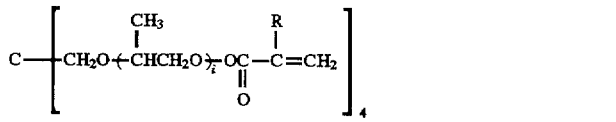
(e)

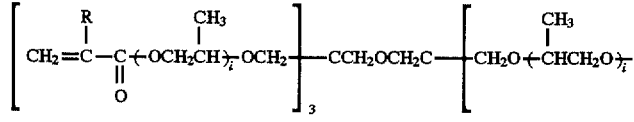
(f)

In formulae (c) to (f), R is as defined above; A represents

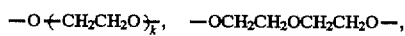

or 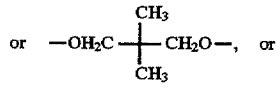, or

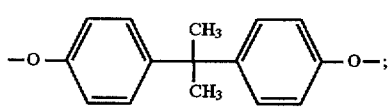

and i, j, and k each represents an integer of from 1 to 10.

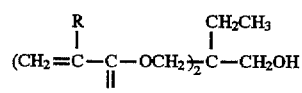
(g)

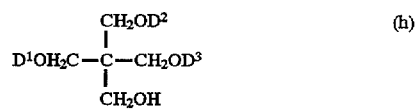
(h)

wherein R is as defined above.

wherein $D^1$, $D^2$, and $D^3$ each represents a hydrogen atom or a (meth)acryloyl group, provided that at least two of them represent a (meth)acryloyl group.

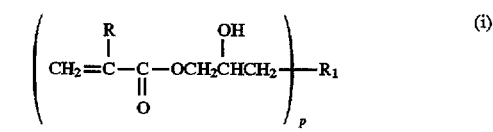
(i)

wherein R is as defined above; p represents an integer of from 2 to 5; and $R_1$ represents an aliphatic group or an aromatic group.

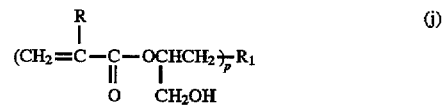
(j)

wherein R, p, and $R_1$ are as defined above.

The aliphatic group or aromatic group of $R_1$ preferably has 1 to 20 carbon atoms.

Specific examples of the compounds represented by formulae (a) to (j) are shown below.

(I-1) Ethylene glycol di(meth)acrylate (I-2) Diethylene glycol di(meth)acrylate (I-3) Triethylene glycol di(meth)acrylate (I-4) Polyethylene glycol di(meth)acrylate (number average molecular weight: 150 to 1000)

(I-5) Propylene glycol di(meth)acrylate (I-6) Dipropylene glycol di(meth)acrylate (I-7) Tripropylene glycol di(meth)acrylate (I-8) Polypropylene glycol di(meth)acrylate (number average molecular weight: 250 to 1000)

(I-9) Neopentyl glycol di(meth)acrylate (I-10) 1,3-Butanediol di(meth)acrylate (I-11) 1,4-Butanediol di(meth)acrylate (I-12) 1,6-Hexanediol di(meth)acrylate (I-13) Hydroxypivalic acid ester neopentyl glycol di(meth)acrylate (I-14) 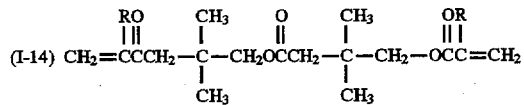

(wherein R is a hydrogen atom or a methyl group)

(I-15) 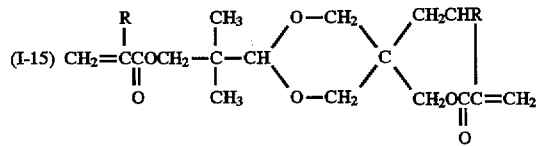

(Wherein R is a hydrogen atom or a methyl group)

(I-16) Bisphenol A di(meth)acrylate (I-17) Trimethylolpropane tri(meth)acrylate (I-18) Pentaerythritol tri(meth)acrylate (I-19) Dipentaerythritol hexa(meth)acrylate (I-20) Pentaerythritol tetra(meth)acrylate (I-21) Trimethylolpropane di(meth)acrylate (I-22) Dipentaerythritol monohydroxypenta(meth)acrylate (I-23) Polypropylene glycol-modified neopentyl glycol diacrylate (I-24) Polyethylene glycol-modified bisphenol A diacrylate -continued (I-25) Polypropylene glycol-modified trimethylolpropane triacrylate (I-26) Polyethylene glycol-modified trimethylolpropane triacrylate (I-27) Dipentaerythritol hexaacrylate (I-28) Tris (2-acryloxy) isocyanurate (I-29) 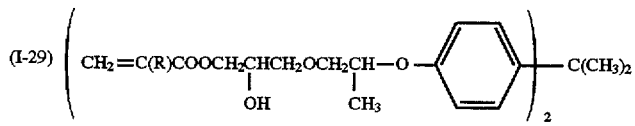

(wherein R represents a hydrogen atom, a fluorine atom, or a methyl group)

(I-30) 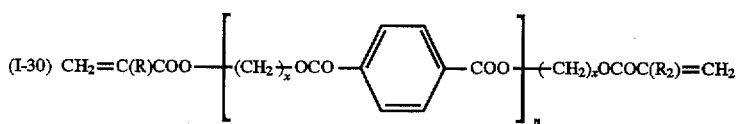

(wherein n and x each represents an integer of from 1 to 10, and R and $R_2$ each represents a hydrogen atom, a fluorine atom, or a methyl group)

(I-31) 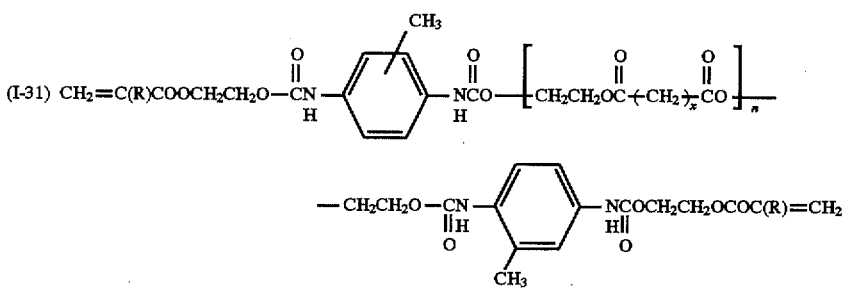

(wherein n and x each represents an integer of from 1 to 10; and R represents a hydrogen atom or a methyl group)

(I-32) Polyethylene glycol 400 di(meth)acrylate (I-33) 1,3-Bis(3'-acryloxyethoxy-2'-hydroxypropyl) 5,5-dimethylhydantoin (I-34) 

(I-35) 

(I-36) 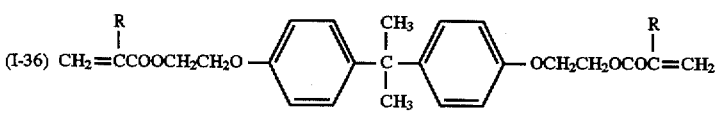

(I-37) 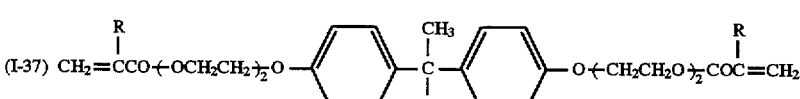

(I-38) 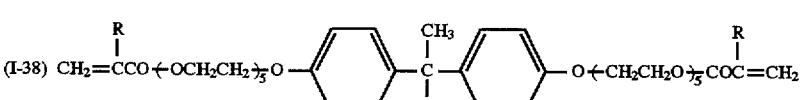

(I-39) 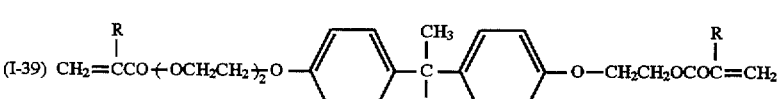

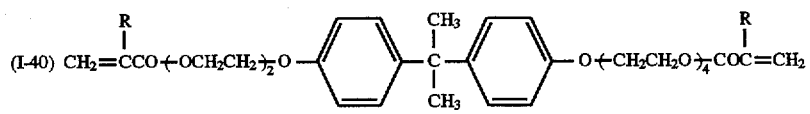
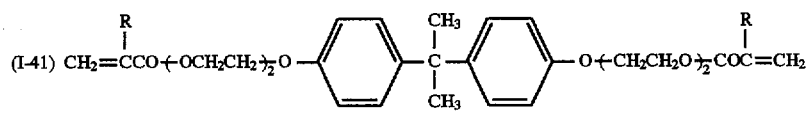
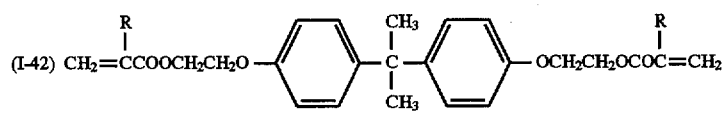
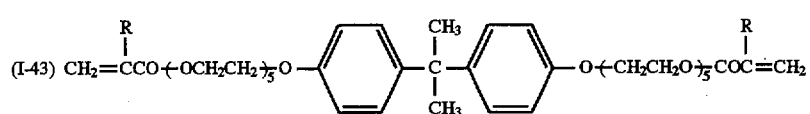
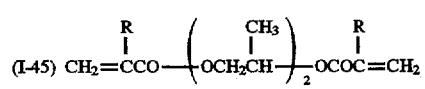
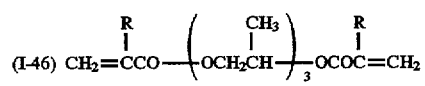
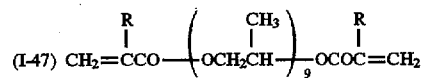
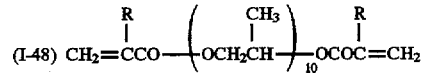
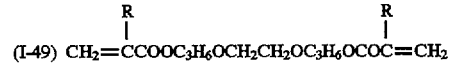
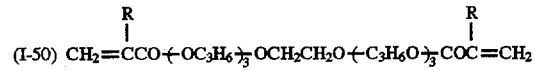
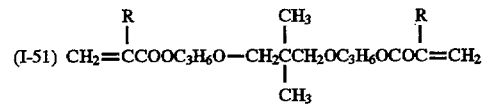
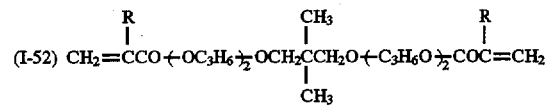
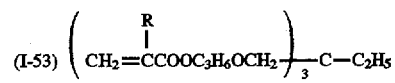
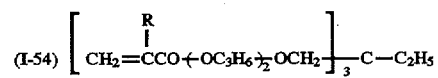
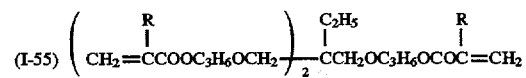
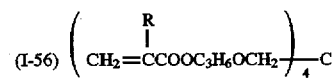

(I-57) 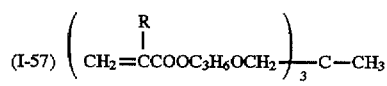
(I-58) 
(I-59) 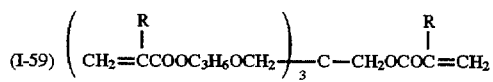
(I-60) 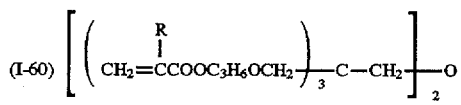
(I-61) 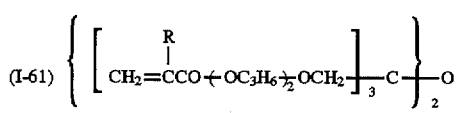
(I-62) 
(I-63) 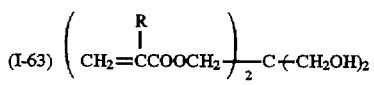
(I-64) 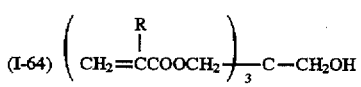
(I-65) Dipentaerythritol diacrylate
(I-66) Dipentaerythritol triacrylate
(I-67) Dipentaerythritol tetraacrylate
(I-68) Dipentaerythritol pentaacrylate
(I-69) 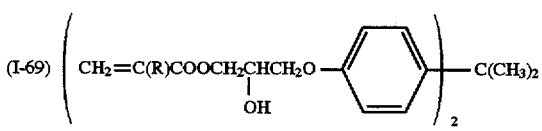
(I-70) 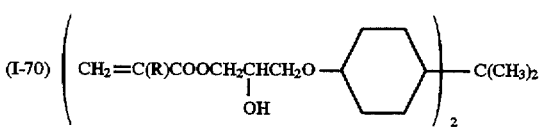
(I-71) 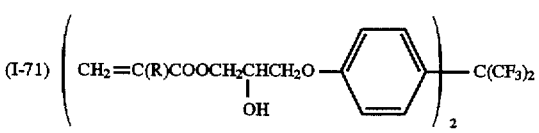
(I-72) 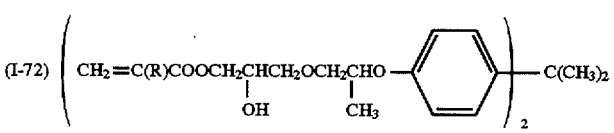
(I-73) 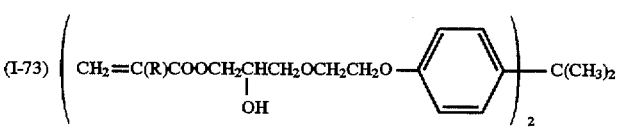

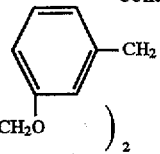

(I-74) $\left( CH_2=C(R)COOCH_2\underset{OH}{CHCH_2O}\text{—} \right)_2$ (I-75) $CH_2=C(R)COOCH_2\underset{OH}{CHCH_2}O+CH_2CH_2O)_q$ $CH_2=C(R)COOCH_2\underset{OH}{CHCH_2}O\text{—}$ (Wherein q represents an integer of from 1 to 10)

(I-76) $CH_2=C(R)COOCH_2\underset{OH}{CHCH_2}O+CH_2\underset{CH_3}{CHO})_q$ $CH_2=C(R)CCOCH_2\underset{OH}{CHCH_2}O\text{—}$ (Wherein q represents an integer of from 1 to 10)

(I-77) $\left( CH_2=C(R)COOCH_2\underset{OH}{CHCH_2}\text{—}OCH_2 \right)_2 \underset{OH}{CH}$ (I-78) $\left( CH_2=C(R)COOCH_2\underset{OH}{CHCH_2}OCH_2 \right)_2 \underset{CH_3}{\overset{CH_3}{C}}$ (I-79) $CH_2=C(R)COOCH_2\underset{OH}{CHCH_2}O+CH_2)_q$ $CH_2=C(R)COOCH_2\underset{OH}{CHCH_2}O\text{—}$ (Wherein q represents an integer of from 2 to 9)

(I-80) $\left( CH_2=C(R)COOCH_2\underset{OH}{CHCH_2}OCH_2 \right)_3 \text{—}C\text{—}C_2H_5$ (I-81) $\left( CH_2=C(R)COOCH_2\underset{OH}{CHCH_2}OCH_2 \right)_3 \text{—}CCH_2OH$ (I-82) $\left( CH_2=C(R)COOCH_2\underset{OH}{CHCH_2}OCH_2 \right)_3 \text{—}C(CH_2OH)_2$ (I-83) $\left( CH_2=C(R)COOCH_2\underset{OH}{CHCH_2}OCH_2 \right)_3 \text{—}C$ (I-84) $\left( CH_2=C(R)\overset{O}{\overset{\|}{C}}OCH_2\underset{OH}{CHCH_2}OCH_2 \right)_3 \text{—}CCH_2OCH_2C\overset{CH_2OH}{\underset{}{|}}\text{—}\left( CH_2OCH_2\underset{OH}{CHCH_2}O\overset{O}{\overset{\|}{C}}C(R)=CH_2 \right)_2$ (I-85) $\left[ \left( CH_2=C(R)COOCH_2\underset{OH}{CHCH_2}OCH_2 \right)_3 \text{—}C\text{—}CH_2 \right]_2 O$

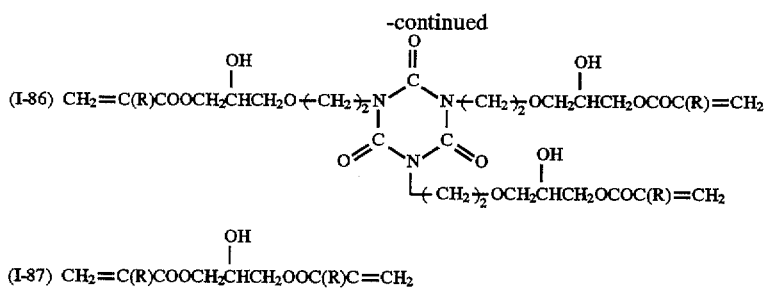

(I-86) CH₂=C(R)COOCH₂CHCH₂O(CH₂)₂N ... N(CH₂)₂OCH₂CHCH₂OCOC(R)=CH₂ (with OH groups and triazine-trione ring, third arm L(CH₂)₂OCH₂CHCH₂OCOC(R)=CH₂ with OH)

(I-87) CH₂=C(R)COOCH₂CHCH₂OOC(R)C=CH₂
                                 OH

In formulae (I-34) to (I-87), R represents a hydrogen atom, a fluorine atom, or a methyl group.

Specific examples of the curing compounds having one fluoroacryloyl group or (meth)acryloyl group per molecule are shown below.

(I-88) (Meth)acrylic acid (I-89) $C_{1-18}$ Alkyl (meth)acrylate (I-90) Phenoxyethyl (meth)acrylate (I-91) Ethoxyethyl (meth)acrylate (I-92) Methoxyethyl (meth)acrylate (I-93) Butoxyethyl (meth)acrylate (I-94) N,N-Diethylaminoethyl (meth)acrylate (I-95) N,N-Dimethylaminoethyl (meth)acrylate (I-96) Glycidyl (meth)acrylate (I-97) Allyl (meth)acrylate (I-98) 2-Hydroxyethyl (meth)acrylate (I-99) 2-Hydroxypropyl (meth)acrylate (I-100) 2-Methoxyethoxyethyl (meth)acrylate (I-101) 2-Ethoxyethoxyethyl (meth)acrylate (I-102) Benzyl (meth)acrylate (I-103) Cyclohexyl (meth)acrylate (I-104) Dicyclopentenyl (meth)acrylate (I-105) Dicyclopentenyloxyethyl (meth)acrylate (I-106) 2-Hydroxyethyl (meth)acryloylphosphate (I-107) Tetrahydrofurfuryl (meth)acrylate (I-108) Dicyclopentadienyl (meth)acrylate (I-109) Dicyclopentadieneethoxy (meth)acrylate (I-110) p-Benzylphenoxyethyl (meth)acrylate (I-111) 1,6-Hexanediol mono(meth)acrylate (I-112) Neopentyl glycol mono(meth)acrylate (I-113) Glycerin mono(meth)acrylate (I-114) Trimethylolpropane mono(meth)acrylate (I-115) Pentaerythritol mono(meth)acrylate (I-116) 2-Hydroxy-3-phenyloxypropyl (meth)acrylate (I-117) 2-Hydroxy-3-octyloxypropyl (meth)acrylate (I-118) Diethylene glycol mono(meth)acrylate (I-119) Polyethylene glycol 400 mono(meth)acrylate (I-120) 2-(Perfluorooctyl)ethyl (meth)acrylate (I-121) Isobornyl (meth)acrylate (I-122) Dicyclopentanyl (meth)acrylate (I-123) Phenyl (meth)acrylate (I-124) CH₂=CHCOOCH₂CH₂OP(=O)(OH)—OH (I-122) Isooctyl (meth)acrylate While compounds (I-69) to (I-87) are α-added epoxy-modified (meth)acrylates, the corresponding β-added compounds are also included in the group of curing compounds (I-iii). While compounds (I-1) to (I-124) are compounds containing an acryloyl group or a methacryloyl group as an acryloyl type group, the corresponding compounds containing a fluoroacryloyl group as an acryloyl type group are also employable. The above-mentioned specific examples are for illustrative purposes only but not for limitation.

A composition ratio of the monofunctional compound and the bi- or multi-functional compound which constitute curing compounds (I) is not particularly limited and ranges from 100:0 to 0:100 by weight. Where ultraviolet light is utilized as a curing energy, the above-described weight ratio preferably ranges from 98:2 to 0:100, and particularly from 95:5 to 0:100, from the standpoint of curing properties and toughness of the resulting cured film.

As described above, while curing compound (I) may comprise solely a compound containing one acryloyl type group per molecule such as compounds (I-88) to (I-124), it is desirable that curing compound (I) comprises at least a compound containing two or more acryloyl type groups per molecule such as compounds (I-1) to (I-87).

Use of curing compound (I) containing two or more acryloyl type groups as a main component in combination with curing compound (I) containing one acryloyl type group is effective to control viscosity and reactivity of the curing composition as well as hardness after curing.

The curing composition according to the present invention may further contain a coupling agent which is an organic compound containing two or more different reactive groups in the molecule thereof (hereinafter referred to as coupling agent (II)). Examples of such coupling agents (II) include silane coupling agents, titanium coupling agents, aluminum coupling agents, zirconium coupling agents, and zirconium/aluminum coupling agents, with silane coupling agents being preferred.

These coupling agents may be used either individually or in combination of two or more thereof.

Silane coupling agents which can be preferably used in the present invention are organosilicon compounds containing at least two different reactive groups per molecule, for example, a reactive group capable of reacting with glass and a reactive group capable of reacting with an acryloyl type group. Such silane coupling agents include those represented by formulae (k) and (l):

$$\overset{R'_n}{\underset{|}{Y-R-Si-X_m}} \quad (k)$$

wherein Y represents a (meth)acryloyl group (inclusive of an acryloyl group and a methacryloyl group, hereinafter the same), a fluoroacryloyl group, a vinyl group, an amino group, a mercapto group, an oxyglycidyl group, an isocyanato group, or a halogen atom; R represents a straight chain or branched alkylene group; R' represents a straight chain or branched alkyl group; X represents a hydroxyl group, an alkoxy group, or a halogen atom; n represents 0 or 1; and m is 3–n.

$$\overset{R'_n}{\underset{|}{X'-\underset{|}{N}-R-Si-X_m}} \quad (l)$$
$$\phantom{X'-}Y$$

wherein R, R', n, and m are as defined above; and X' and Y', which may be the same or different, each represents an aminoalkyl group, a (meth)acryloyl group, a fluoroacryloyl group, a hydroxyl group, a glycidyl group, an aryl group, a trialkoxysilylalkyl group, or a dialkoxyalkylsilylalkyl group.

Specific examples of these silane coupling agents are shown below.

(II-1) $CH_2=CHSiCl_3$ (II-2) $CH_2=CHSi(OCH_3)_3$ (II-3) $CH_2=CHSi(OC_2H_5)_3$ (II-4) $CH_2=CHSi(OCH_3)_2$
$\phantom{CH_2=CHSi(OCH_3)_2}|$
$\phantom{CH_2=CHSi(OCH)}CH_3$ (II-5) $CH_2=CHSi(OCH_2CH_2OCH_3)_3$ (II-6) $H_2NCH_2CH_2NHCH_2CH_2CH_2Si(OCH_3)_2$
$\phantom{H_2NCH_2CH_2NHCH_2CH_2CH_2Si(OCH_3)_2}|$
$\phantom{H_2NCH_2CH_2NHCH_2CH_2CH_2Si(OCH)}CH_3$ (II-7) $H_2NCH_2CH_2NHCH_2CH_2CH_2Si(OCH_3)_3$ (II-8) $H_2NCH_2CH_2CH_2Si(OC_2H_5)_3$ (II-9) $CH_2=CHCH_2NHC_2H_4NHC_3H_6Si(OCH_3)_3$ (II-10) $CH_2=CHCH_2NHC_3H_6Si(OCH_3)_3$ (II-11) 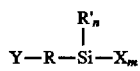 $NC_3H_6Si(OCH_3)_3$ (II-12) 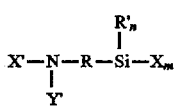—$NH_2C_3H_6Si(OCH_3)_3$ (II-13) $CH_2=\overset{\overset{CH_3}{\|}}{C}COOC_3H_6Si(OCH_3)_3$ (II-14) $CH_2=\overset{\overset{CH_3}{\|}}{C}COOC_3H_6Si(OCH_3)_2$
$\phantom{CH_2=CCOOC_3H_6Si(OCH_3)_2}|$
$\phantom{CH_2=CCOOC_3H_6Si(OCH)}CH_3$ (II-15) $CH_2=CHCOOC_3H_6Si(OCH_3)_3$ (II-16) $CH_2=CHCOOC_3H_6Si(OCH_3)_2$
$\phantom{CH_2=CHCOOC_3H_6Si(OCH_3)_2}|$
$\phantom{CH_2=CHCOOC_3H_6Si(OCH)}CH_3$ (II-17) $CH_2\underset{\diagdown\;\diagup}{\phantom{xx}}CHCH_2OC_3H_6Si(OCH_3)_3$
$\phantom{CH_2}O$ (II-18) $CH_2\underset{\diagdown\;\diagup}{\phantom{xx}}CHCH_2OC_3H_6Si(OCH_3)_2$
$\phantom{CH_2}O\phantom{CHCH_2OC_3H_6Si(OCH_3)}|$
$\phantom{CH_2}\phantom{O\;CHCH_2OC_3H_6Si(OCH)}CH_3$ (II-19) 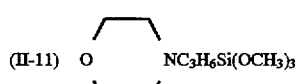

(II-20) $ClCH_2CH_2CH_2Si(OCH_3)_2$
$\phantom{ClCH_2CH_2CH_2Si(OCH_3)_2}|$
$\phantom{ClCH_2CH_2CH_2Si(OCH)}CH_3$ (II-21) $ClCH_2CH_2CH_2Si(OCH_3)_3$ (II-22) $HSCH_2CH_2CH_2Si(OCH_3)_3$ (II-23) $[CH_2=C(CH_3)COO\tfrac{1}{2}N(CH_2)_3Si(OCH_3)_3$ (II-24) 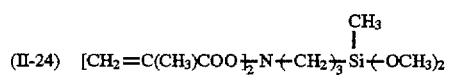

(II-25) 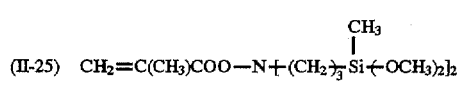

Compounds obtained by hydrolyzing the above-described compounds in a usual manner to convert a part or the whole of the alkoxy groups to a silanol group are also included in the silane coupling agents to be used in the present invention.

Specific but non-limiting examples of useful titanium coupling agents are shown below.

(II-26) 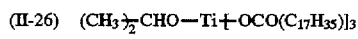

(II-27) 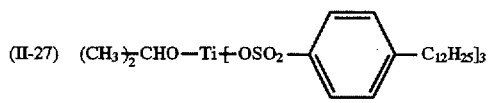

(II-28) 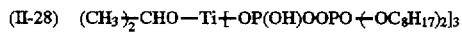

(II-29) 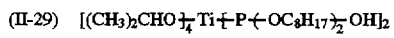

(II-30) 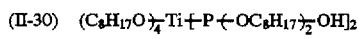

(II-31) 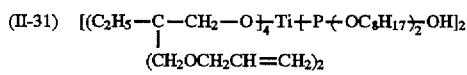

(II-32) 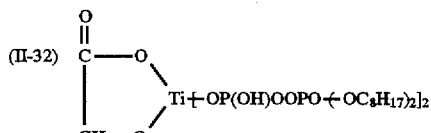

(II-33) 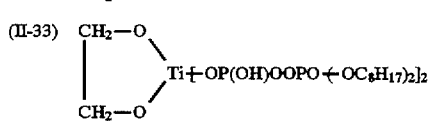

The above-mentioned specific examples of coupling agents (II) are for illustrative purposes only but not for limitation.

Emulsification and dispersion of curing compound (I) in water can be effected, if necessary, with the aid of (III) an emulsifying agent and/or (IV) a water-soluble high polymer.

Emulsifying agent (III) to be used is not particularly limited as long as it helps curing compound (I) be stably emulsified and dispersed in water. Useful emulsifying agents (III) include anionic, cationic or nonionic surface active agents. From the standpoint of preservation stability of the curing composition, nonionic or anionic surface active agents are preferred. Further, from the standpoint of water resistance of the resulting cured film and stability of the emulsification dispersion, nonionic surface active agents are particularly preferred.

Specific but non-limiting examples of useful nonionic surface active agents are polyoxyethylene alkylphenyl ethers, polyoxyethylene alkyl ethers, polyoxyethylene fatty acid esters, polyoxyethylene polyoxypropylene block copolymers, sorbitan fatty acid esters, polyoxyethylene sorbitan fatty acid esters, polyoxyethylene alkylamine ethers, fatty acid diethanolamides, sucrose esters, polyoxyethylene lanolin alcohol ethers, and polyoxyethylene lanolin fatty acid esters. With respect to anionic or cationic surface active agents, any of commonly employed compounds may be used. The above-mentioned specific examples of emulsifying agents (III) are for illustrative purposes only but not for limitation.

These emulsifying agents (III) may be used either individually or in combination of two or more thereof. Where two or more kinds of emulsifying agents are used, a combination of polyoxyethylene alkylphenyl ether and a polyoxyethylene polyoxypropylene block copolymer is recommended. In particular, such a combination preferably has an HLB (hydrophile-lipophile balance) value of 12 or higher.

Examples of useful water-soluble high polymers (IV) which can be used in the present invention include natural high polymers, e.g., gum arabic, agar-agar, starch and its derivatives, and gelatin; and synthetic high polymers, e.g., water-soluble urethane resins, polyvinyl alcohol, vinyl acetate polymers, and acrylic polymers. Preferred water-soluble high polymers (IV) are those which are uniformly dissolved in water and exhibit good compatibility with curing compounds (I). For example, in using acrylates as curing compound (I), polymers of a water-soluble acrylate, i.e., water-soluble acrylic polymers, are preferred as water-soluble high polymer (IV).

In particular, water-soluble high polymers obtained by polymerizing, as an essential monomer, a compound containing at least one acryloyl type group selected from the group consisting of an acryloyl group, a methacryloyl group, and a fluoroacryloyl group in the molecule thereof are preferred as water-soluble high polymer (IV). The compound containing at least one acryloyl type group preferably further contains a carboxyl group or an alkyl group having 6 or more carbon atoms.

Of the water-soluble acrylic polymers, preferred are those containing an acidic group, a basic group or the salt thereof in combination with a straight chain or branched alkyl group having 6 or more carbon atoms. Inter alia, those containing an acidic group or a salt thereof and a straight chain or branched alkyl group having from 10 to 25 carbon atoms are preferred.

The water-soluble acrylic polymers are not particularly restricted in constitution but preferably comprise a monomer unit represented by formula (IV-1) shown below and a monomer unit represented by formula (IV-2) shown below with or without a monomer unit represented by formula (IV-3) shown below.

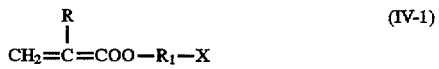

wherein R represents a hydrogen atom, a fluorine atom, a methyl group, or a fluoroalkyl group; $R_1$ represents a straight chain or branched alkylene group or a fluoroalkylene group; and X represents a hydrophilic group or a precursor thereof, selected from the group consisting of a carboxyl group, a hydroxyl group, an amino group, a quaternary ammonium group, a sulfonic acid group, a phosphoric acid group, a silanol group, a polyoxyethylene group, and a salt of these groups.

wherein R is as defined above; and $R_2$ represents a fluoroalkyl group or a straight chain or branched alkyl group having 6 or more carbon atoms.

(IV-3)

wherein R is as defined above; and $R_3$ represents a fluoroalkyl group or a straight chain or branched alkyl group having not more than 5 carbon atoms.

Examples of the compounds of formula (IV-1) include: carboxyl-containing α,β-ethylenically unsaturated compounds, e.g., acrylic acid, methacrylic acid, $HOOCCH_2CH_2$—COO—$C_2H_4OCOCH=CH_2$, and ethylene oxide-modified polycarboxylic acid mono(meth)acrylates

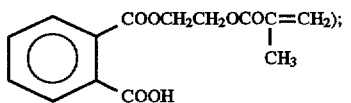

phospho- or phosphate-containing α,β-ethylenically unsaturated compounds, e.g.,

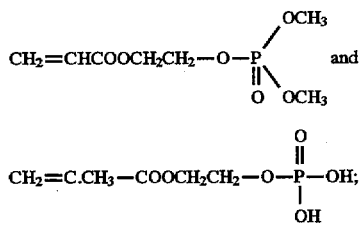

amino- or quaternary ammonium base-containing α,β-ethylenically unsaturated compounds, e.g.,

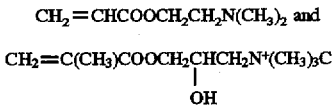

nonionic group-containing α,β-ethylenically unsaturated compounds, e.g., mono(meth)acrylic esters of polyhydric alcohols and mono(meth)acrylic esters of polyethylene glycol; and silanol-containing α,β-ethylenically unsaturated compounds, e.g., a hydrolysis product of γ-(methacryloxypropyl)trimethoxysilane.

Specific examples of the compounds of formula (IV-2) include n-hexyl (meth)acrylate, n-octyl (meth)acrylate, 2-ethylhexyl (meth)acrylate, n-nonyl (meth)acrylate, n-decyl (meth)acrylate, isodecyl (meth)acrylate, n-dodecyl (meth)acrylate, isododecyl (meth)acrylate, n-hexadecyl (meth)acrylate, stearyl (meth)acrylate, isostearyl (meth)acrylate, eicosanyl (meth)acrylate, docosanyl (meth)acrylate, and pentacosanyl (meth)acrylate.

Specific examples of the compounds of formula (IV-3) include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, and n-pentyl (meth)acrylate.

In the preparation of the water-soluble acrylic polymers, the monomers of formula (IV-1), (IV-2), and (IV-3) are used, while not limiting, usually in an amount of from 20 to 40 mol %, from 1 to 10 mol %, and from 50 to 79 mol %, respectively, based on the total monomers. It is particularly desirable to use the compound of formula (IV-1) in such a proportion that the resulting water-soluble acrylic polymer may contain a carboxyl group or a salt thereof in an amount of from 0.4 to 11 gram-equivalents per kg of the solids content thereof.

The water-soluble acrylic polymer can be prepared by any of known processes, such as solution polymerization, emulsion polymerization, bulk polymerization, suspension polymerization, and radiation polymerization, under appropriately selected conditions of temperature and time.

A water-dispersible acrylic polymer may be used in place of the water-soluble acrylic polymer. It should be noted, however, that in cases where the curing composition is to be applied to a flawable base (hereinafter defined), the water-soluble acrylic polymers are preferable to water-dispersible acrylic polymers in terms of penetrability into the base, with curing compound (I) to be dispersed and the monomer composition of the acrylic polymers being the same.

The method for emulsification-dispersing curing compound (I) in water is not particularly restricted. For example, in using curing compound (I) having self-emulsifiability, such curing compound may be added dropwise to water with stirring, or water may be added dropwise to the curing compound with stirring. In using hydrophobic curing compound (I), emulsifying agent (III), water-soluble high polymer (IV), or both of them can be employed. In this case, too, any dispersing method can be utilized, including self-emulsification, simultaneous emulsification, reverse phase emulsification, paste method, and electrical or mechanical emulsification-dispersing techniques, such as electrical dispersion and dispersion by means of an ultrasonic colloid mill or a homogenizer. Reverse phase emulsification and paste method are preferred for hydrophobic curing compounds.

Emulsifying agent (III) and/or water-soluble high polymer (IV) are used in such an amount sufficient for curing compound (I) to be dispersed in water. Taking water-resistance and surface properties of a cured film into consideration, emulsifying agent (III) or water-soluble high polymer (IV) is preferably used in an amount of not more than 15 parts by weight or not more than 30 parts by weight, respectively, per 100 parts by weight of the total components of the curing composition except water.

Coupling agent (II), while optional in the present invention, is of importance for improving adhesion between the curing composition and a base to be reinforced, e.g., an inorganic oxide material.

Coupling agent (II) may be present in any phase. For example, (i) coupling agent (II) is incorporated into an oily phase by once dissolving coupling agent (II) in curing compound (I) and emulsifying the solution in water, (ii) coupling agent (II) is incorporated into an aqueous phase by adding to an emulsion dispersion of curing compound (I) in water, (iii) coupling agent (II) is incorporated into a water/oil interface by adding to water-soluble high polymer (IV) through copolymerization, or (iv) coupling agent (II) is incorporated into both of oily and aqueous phases by a combination of these methods. A previously prepared emulsion dispersion of coupling agent (II) may be mixed with an emulsion dispersion of curing compound (I).

To ensure improvements in dynamic strength of an inorganic oxide and in adhesion between the cured film and the inorganic oxide, it is desirable that the oily phase to which coupling agent (II) is to be added should have high hydrophobic properties, or the aqueous phase to which coupling agent (II) is to be added should be neutral to weakly acidic. If desired, a stabilizer for coupling agent (II) may be used in combination.

The curing composition of the present invention may further contain, if desired, (V) a catalyst for coupling agent (II) (hereinafter referred to as coupling agent catalyst (V)). Useful coupling agent catalyst (V) includes acids, bases, salts, and organometallic compounds, such as organozinc compounds, organotin compounds, and organoplatinum compounds.

Of these catalysts (V), the acid may be an externally supplied organic or inorganic acid, or the acid radical present in curing compound (I) or (meth)acrylic acid occurring therefrom by decomposition may serve as an acid catalyst.

Examples of the acid component include compounds formed by addition of succinic anhydride or phthalic anhydride to a hydroxyl group of curing compounds of formulae (g) through (i); compound (I-88), compound (I-124);

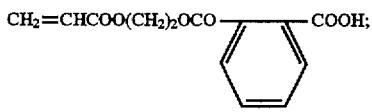
$CH_2=CHCOO(CH_2)_2OCO$ ——COOH;

$CH_2=CHCONHC(CH_3)_2CH_2SO_3H$; acetic acid, fatty acids containing an alkyl group having from 2 to 18 carbon atoms, methanesulfonic acid, alkylsulfonic acids containing an alkyl group having from 2 to 18 carbon atoms, trifluoromethanesulfonic acid, p-toluenesulfonic acid, benzoic acid, phthalic acid, formic acid, lactic acid, cinnamic acid, hydrochloric acid, sulfuric acid, nitric acid, and perchloric acid.

The bases include various amines, ammonia, lithium hydroxide, potassium hydroxide, and sodium hydroxide.

The salts include ammonium chloride, ammonium perchlorate, sodium carbonate, sodium hydrogencarbonate, and sodium hydrogenphosphate.

The organozinc compounds include $R_2$—COO.Zn.OCOR$_2'$ and $(R_2)_n$.Zn.(OCOR$_2'$)$_m$, $R_2$ and $R_2'$, which may be the same or different, each represent a hydrogen atom or a straight chain or branched alkyl group; n is from 1 to 4; and m is 4-n.

The organotin compounds include $R_2$—COO.Sn.OCOR$_2'$ and $(R_2)_n$.Sn.(OCOR$_2'$)$_m$, wherein $R_2$, $R_2'$, m, and n are as defined above.

Specific examples of these organometallic compounds are zinc octylate, tin octylate, dibutyltin diacetate, dibutyltin dioctate, and dibutyltin dilaurate.

The above-mentioned specific examples of coupling agent catalysts (V) are for illustrative purpose only but not for limitation.

According to the study of the inventors, when coupling agent (II) and coupling agent catalyst (V) are employed, the latter is preferably present in a phase different from the phase where the former is present or in an emulsified and dispersed system from the viewpoint of preservation stability of the curing composition. For example, in the case where coupling agent (II) is dissolved in curing compound (I), the solution is emulsified and dispersed in water, and the resulting emulsion is added to an oily phase, it is preferable that a water-soluble coupling agent catalyst be added to an aqueous phase. On the other hand, in the case where curing compound (I) is emulsified and dispersed in water and then coupling agent (II) is added to the aqueous layer, it is preferable that an oil-soluble coupling agent catalyst be previously dissolved in curing compound (I) and then added to an oily phase. In the case where coupling agent (II) is added to an oil phase and/or an aqueous phase, it is also preferable that coupling agent catalyst (V) be previously supported on water-soluble high polymer (IV).

Catalyst (V) can be supported on water-soluble high polymer (VI) by, for example, reacting coupling agent catalyst (V), e.g., ammonia, with a carboxyl group of a water-soluble acrylic polymer to form an ammonium salt. The thus supported catalyst can be released from the water-soluble high polymer (VI) on heating for drying after application of the curing composition on an inorganic oxide material to thereby exert its catalyst action.

For the purpose of improving uniformity of application of the curing composition to an inorganic oxide material, it is preferable that the composition further contains a leveling agent or a surface active agent. Any leveling agent or surface active agent of hydrocarbon type, silicone type or fluorine type may be used. Addition of an oil-soluble fluorine type surface active agent (VI) is especially effective to improve mechanical strength of an inorganic oxide.

Oil-soluble fluorine type surface active agents (VI) which can be used in the present invention are compounds containing at least one fluorinated aliphatic group having 1 to 20 carbon atoms per molecule and having a solubility of 0.1% by weight or more in organic solvents at 25° C. Such compounds typically include (1) compounds having a fluorinated aliphatic group bonded to a polar group via a divalent linking group and (2) polymers having a fluorinated aliphatic group in the side chain thereof.

Specific examples of the former compounds (1) are as follows.

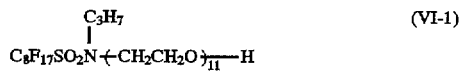  (VI-1)

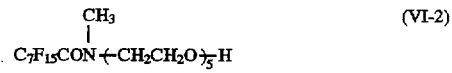  (VI-2)

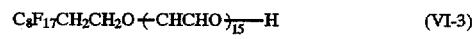  (VI-3)

  (IV-4)

Some of the latter compounds (2) are commercially available. Examples of commercially available products serving as oil-soluble fluorine type surface active agent (VI) include fluorine type surface active agents under trade names of MEGAFAC F-177, F-173, F-172, F-171, and F-184; surface modifiers under trade names of DEFENSA MCF-300, MCF-312, and MCF-323; and solvent type water- and oil-repellants under trade names of DICGUARD F-320 and F-327; all produced by Dainippon Ink and Chemicals, Inc.

Fluorine type polymers having various molecular structures meeting the characteristics demanded may also be synthesized and used. For example, copolymers comprising a fluorinated (meth)acrylate containing a fluorinated aliphatic group having 1 to 20 carbon atoms and the above-mentioned monofunctional monomer having one (meth)acryloyl group per molecule can be used. Specific examples of such fluorine type copolymers are shown below.

(VI)-5 Copolymer comprising

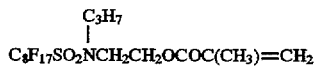

and methyl methacrylate at a molar ratio of 1:5 (average molecular weight: 20,000)

(VI-6) Copolymer comprising $C_nF_{2n+1}CH_2CH_2OCOCH=CH_2$ (n: a mixture of numbers from 1 to 16; average molecular weight: 520) and a methyl methacrylate macromer having an average molecular weight of about 5,000 at a molar ratio of 3:1 (average molecular weight: 40,000)

(VI-7) Polyurethane comprising $C_{10}F_{21}CH_2CH_2OH$, polypropylene glycol (molecular weight: 5000), and tolylene diisocyanate at a molar ratio of 2:1:2 (average molecular weight: 5,900)

(VI-8) Polyester comprising $C_8F_{17}SO_2N(CH_2CH_2OH)_2$, polyethylene glycol, and adipic acid at a molar ratio of 1:3:4 (average molecular weight: 4,700)

The curing composition of the present invention is applied to an inorganic oxide material, either previously treated or untreated with a coupling agent, by coating or impregnation. The coated film is then cured by polymerization on application of active energy rays or heat to form a cured film.

Active energy rays which can be used for curing include microwaves, far infrared rays, infrared rays, visible rays, ultraviolet rays, electron rays, and radiations (e.g., β-rays and γ-rays). The curing composition containing electron ray-curing compound (I) is an electron ray-curable composition, and the curing composition containing ultraviolet ray-curing compound (I) is an ultraviolet ray-curable composition.

In using light such as ultraviolet rays as active energy rays, (VII) a photopolymerization initiator common in the art may be used. Examples of useful photopolymerization initiators (VII) include (VII-1) benzophenone, (VII-2) acetophenone, (VII-3) benzoin, (VII-4) benzoin ethyl ether, (VII-5) benzoin isobutyl ether, (VII-6) benzyl methyl ketal, (VII-7) azobisisobutyronitrile, (VII-8) 1-hydroxycyclohexyl phenyl ketone, and (VII-9) 2-hydroxy-2-methyl-1-phenylpropan-1-one. If desired, photopolymerization initiator (VII) may be used in combination with a photosensitizer, such as an amine compound and a phosphorus compound, to improve the rate of polymerization reaction. Where polymerization is induced by application of electron rays or radiations, a photopolymerization initiator is not particularly needed.

While not limiting, the curing composition according to the present invention preferably has an acid value of from 0 to 80, and particularly from 0 to 40. The terminology "acid value" as used herein means a milligram number of potassium hydroxide required for neutralizing an acid contained per gram of the composition to a pH of 7.

The inorganic oxide material to which the curing composition of the invention can be applied is not particularly limited and includes, for example, crystalline inorganic oxides, e.g., silicon carbide and ceramics; and glass. The term "glass" as used herein includes all the substances generally called glass, such as ordinary oxide glass and non-oxide glass, and functional glass called new glass. From the viewpoint of the market demand and utility of the coat intimately adhered to glass and the thus reinforced glass, oxide glass is of importance. The shape or forms of the inorganic oxide materials is not limited and includes, for example, powders, fibers, plates, containers, and bottles.

As previously stated, inorganic oxide materials are easily broken while excellent in hardness and resistance to scratches, heat and chemicals. They suffer from breakage at an applied strength of 1/100 to 1/1000 of a theoretical strength because a breakage stress is centered at tips of fine cracks or scratches which occur during production, for example, during heat treatment. The above-described terminology "flawable" is used for a base, not limited to an inorganic oxide base, which has such invisible microfine cracks or scratches or which has potentiality of suffering from microfine cracks or scratches with passage of time or under some conditions of use. The curing composition of the present invention, when applied to such a flawable base, penetrates into the fine cracks or scratches or covers the surface of a flawable base to thereby strengthen the base. As a matter of course, "flawable" bases also include those having visible cracks or scratches.

The curing composition of the present invention can be applied to an inorganic oxide material, e.g., glass, by various known techniques, such as coating by means of a brush, an applicator, a bar coater, a roller brush, a roller coater, etc.; spray coating by means of an air spray coater and an airless spray coater; flow coating by means of a shower coater and a curtain flow coater; dip coating; and spinner coating. A proper application technique should be chosen according to the shape or end use of the inorganic oxide material.

In carrying out the present invention for improving dynamic strength of, for example, glass, the thickness of a cured coating film is not particularly limited as far as an improvement in strength can be obtained. A cured film thickness for obtaining such an improvement is usually at least 0.5 μm. In order to form a cured film which keeps toughness and intimate adhesion even after washing with alkaline hot water and/or hot water and to maintain the initial dynamic strength, the curing composition is preferably coated to a cured thickness of from 2 to 200 μm, and particularly from 2 to 30 μm.

The glass base coated or impregnated with the curing composition must be dried to remove water adhered at room temperature or under heating or under reduced pressure.

The curing composition on glass may be cured with active energy rays immediately after being applied, but the inventors confirmed that the adhesion of the cured resin film to glass may further be improved and the effects of increasing dynamic strength may further be enhanced by maintaining the applied curing composition under heat or by irradiating active energy to the applied curing composition thereby activating the composition so as to have ensured reactivity to glass.

The drying step for removal of water and the activation of the composition may be performed simultaneously. Activation of the curing composition may be effected by utilizing heat inertia of the preheated glass, exposure to hot air, or by means of an oven, or by irradiation of the above-described active energy rays.

If desired, a thermal polymerization curing inhibitor may previously be added to the curing composition so as to prevent the curing compound in the composition from being cured during the above-mentioned activation step.

Where activation of the curing composition is conducted by exposure to hot air, the temperature of hot air should fall within a range that cause no thermal polymerization of the curing compound in the curing composition. Such a temperature range is from 40° to 120° C., and preferably from 50° to 80° C. An exposure time is preferably from 10 seconds to 1 hour. With the conditions of active energy ray-curing subsequent to the activation step being fixed, there is observed a tendency that the dynamic strength of the resulting resin-coated glass would be increasing accordingly as the time of exposure to hot air of 60° C. (activation time) is extended up to 60 seconds.

Where activation of the curing composition is conducted by irradiation of active energy rays, it is preferable to use active energy rays different from those to be used in the subsequent curing step, and particularly far infrared rays or microwaves.

If desired, a deactivator for active energy rays may be used in the activation step so that curing compound (I) may not be cured during activation. With the conditions of active energy ray-curing subsequent to the activation step being fixed, there is observed a tendency that the dynamic strength of the resulting resin-coated glass reaches its possible maximum when far infrared rays emitted from a far infrared rays-irradiation apparatus having a surface temperature of 400° C. has been irradiated to the curing composition for 5 seconds. The dynamic strength thus reached tends to be unchanged even with the irradiation time being further extended.

Since the conditions of activation with far infrared rays are subjected to variation depending on the relationship of (1) surface temperature of the irradiation area of an irradiation apparatus, (2) distance between an object to be irradiated and the irradiation area, and (3) irradiation time, each of these three factors should be optimized by repeating actual irradiation several times.

Of the above-mentioned activation methods, activation by means of active energy rays is preferred for the following reasons. (1) The time required is short, and excellent productivity is obtained. (2) Even when the curing composition is applied to an inorganic oxide material (glass) having a three-dimensional shape, partial evaporation of the composition or any change in composition to become non-uniform hardly occurs. (3) The temperature on the surface of an inorganic oxide material hardly rises, causing no deterioration of the material due to thermal history. (4) The energy efficiency is high so that the apparatus to be used can be reduced in size.

Activation or polymerization curing of the curing composition can be carried out by using known light sources, such as germicidal lamps, fluorescent tubes for ultraviolet rays, carbon arc lamps, xenon lamps, high-pressure mercury lamps for copying, medium- or high-pressure mercury lamps, ultrahigh-pressure mercury lamps, electrodeless lamps, metal halide lamps, and natural sunlight for ultraviolet rays; scanning type or curtain type electron accelerators for electron rays; and iron ferrite type or ceramic type emitters for far infrared rays.

The curing composition of the invention can easily be cured by using the above-described active energy rays and generators or emitters thereof.

In cases where a coating layer having a thickness of 1 μm or less is cured by ultraviolet rays, ultraviolet irradiation is preferably conducted in an inert gas atmosphere, such as a nitrogen gas, from the standpoint of polymerization efficiency.

Conditions of active energy ray irradiation are not particularly limited, and the energy quantity and the irradiation time are selected so as to sufficiently cure the curing composition. The irradiation time usually ranges from 1 to 30 seconds.

When heat is utilized as a polymerization initiator, polymerization curing may be effected either in the absence of a catalyst or in the presence of a polymerization initiator, such as azobisisobutyronitrile, benzoyl peroxide, methyl ethyl ketone peroxide, and cobalt naphthenate.

If desired, the curing composition of the invention may further contain, in addition to the polymerization initiator, etc., various additives such as thermal polymerization inhibitors, synthetic resins, light stabilizers, far infrared absorbents, infrared absorbents, ultraviolet absorbents, pigments, dyes, defoaming agents, levelling agents, and surface active agents.

One of the features of the curing composition according to the present invention consists in its marked preservation stability. That is, the composition, even when coated after being preserved for a long time, provides a cured film exhibiting the maximum dynamic strength obtained with the same composition immediately after preparation. Moreover, the inorganic oxide material, e.g., glass, having the cured film of the composition immediately after preparation has higher dynamic strength than that of glass having a cured film of a conventional curing composition.

Another feature of the curing composition of the present invention lies in that a curing compound is emulsified and dispersed in water. Such a construction greatly reduces the necessity of considerations for prevention of fire or environmental pollution and for conservation of working environment which have been essentially required in using general flammable coating compositions having a flash point, i.e., the huge initial investment and running cost.

As is well known, the surface of glass is ready to be contaminated with various substances and tends to have weakened adhesion between the glass base and the coat. It is therefore reasonable that coating and curing of the curing composition should be effected in a line directly connected to the production line of glass products. In general, however, the production line of inorganic oxide products, for example glass products, is not at all given due considerations for handling of flammable chemicals. Thus, use of the conventional coating composition having a flash point in such a reasonable manner would need numerous initial investment, virtually lacking practical utility.

To the contrary, the curing composition of the present invention makes the above-described reasonable production method feasible and, at the same time, makes it possible to omit various treatments which have been added to inorganic oxide products, e.g., glass products, for enhancement and maintenance of dynamic strength.

Since the curing composition of the present invention endows inorganic oxide products, such as glass-made plates, containers and bottles, with markedly improved dynamic strength, it brings about a reduction in thickness of glass products without being accompanied with a reduction in dynamic strength. Therefore, the present invention achieves reduction in both cost and weight of glass products. In addition, the enhancement of dynamic strength of glass by the use of the curing composition leads to broadened application of glass to the fields that have been avoided, thus enlarging the demand of glass.

Production of glass products has been accompanied with occurrence of rejected products due to poor dynamic strength. The dynamic strength of glass products increased to a given level or higher by the curing composition of the present invention not only brings about increased quality but an economical merit of increased yield. Further, the present invention makes it possible to reuse glass having reduced dynamic strength.

Furthermore, since the curing composition of the present invention has an arbitrarily adjusted viscosity by dilution with water, it can be applied to glass materials of any complicated shape, and since active energy rays such as ultraviolet rays transmit into the deep inside of glass materials irrespective of their shape, the composition coated on various shapes can be cured. Accordingly, the curing composition of the invention improves dynamic strength of various glass molded materials irrespective of their size, thickness and shape, including films, plates, rods, spheres, hollow materials, strands, and combinations of these shapes.

Pigments or dyes may be incorporated into the curing composition of the present invention so as to give various tints to flint glass materials. The conventional coloring process has required a considerable interval for color change, during which a loss of products occurs, whereas such a problem can be settled down by use of the curing composition of the present invention.

The present invention is now illustrated in greater detail with reference to Examples, but it should be understood that the present invention is not deemed to be limited thereto. All the percents, parts, and ratios are by weight unless otherwise indicated. Symbols A and M accompanying compound Nos. assigned to curing compounds (I), which are the same as those enumerated above, mean "acrylate compound" and "methacrylate compound", respectively.

EXAMPLE 1

Curing composition (1) having the following composition was prepared as follows. Curing compounds (I) shown below were mixed with coupling agent (II) and emulsifying agents to prepare a uniform solution. To the solution was slowly added ion-exchanged water to cause phase reversal to obtain a stable emulsion dispersion. p-Toluenesulfonic acid was added to the emulsion dispersion as a coupling agent catalyst.

A flash point of curing composition (1), though measured, was not detected. Curing composition (1) had an acid value of 0.13.

| Composition of Curing Composition (1): | |
|---|---|
| Curing Compounds (I): | |
| I-37A | 40 parts |
| I-46A | 10 parts |
| I-82A | 10 parts |
| I-17A | 15 parts |
| I-68A | 15.9 parts |
| I-20A | 5 parts |
| II-13 | 5 parts |
| ACRONAL 4F (hydrocarbon type surface active agent produced by BASF) | 0.1 part |
| VII-8 | 4 parts |
| p-Toluenesulfonic acid.$H_2O$ | 0.05 part |
| PLURONIC F-108 (polyoxyethylene-polyoxypropylene block copolymer type emulsifying agent (HLB: 16.5), produced by Asahi Denka Co., Ltd.) | 4 parts |
| Noigen EA-190D (polyoxyethylene alkylphenyl ether emulsifying agent (HLB: 19.0), produced by Dai-ichi Kogyo Seiyaku Co., Ltd.) | 2 parts |
| Ion-exchanged water | 105 parts |

A commercially available hard glass plate (70×150×2 mm; flawable) was dipped in a 5% sodium hydroxide aqueous solution for 1 hour, washed with distilled water, and dried in a hot air circulation type oven at 60° C. for 5 minutes. The thus treated glass plate was notched with a diamond cutter, and curing composition (1) was coated on the notched side. The glass plate was dried in the same oven as described above at 60° C. for 1 minute (maintenance under heat) and, immediately thereafter, irradiated with ultraviolet rays for 30 seconds by means of a high-pressure mercury lamp (80 W/cm) to cure the curing composition. The thus cured film had a thickness of 3 μm.

Bending strength and hot water-resistance of the resulting sample were evaluated according to the following test methods.

Measurements were made on samples coated with the curing composition immediately after preparation at 25° C. and 60% RH and samples coated with the curing composition after being preserved for 48 hours or 192 hours from the preparation under the same conditions (25° C., 60% RH). The results obtained are shown in Table 1 below, expressed relatively with respect to blanks obtained with non-coated notched samples.

Three-Point Bending Test:

Breaking strength of the sample in three-point bending was measured with a bending tester "Autograph AG-5000C" manufactured by Shimazu Seisakusho Ltd. at a span distance of 50 mm and a head speed of 0.5 mm/min.

Hot Water-Resistance Test:

The sample was dipped in hot water at 80° C., where it was rubbed with a pencil (2H). The time required for the cured film to fall off (peeling time) was measured. Further, after the sample was dipped in hot water at 80° C. for 1 hour, the above-described three-point bending test (n=20) was carried out to obtain breaking strength.

Comparative Example 1

A notched and coated glass plate sample was prepared in the same manner as in Example 1, except for replacing PLURONIC F-108 (4 parts), Noigen EA-190D (2 parts), and ion-exchanged water (105 parts) with 111 parts of methyl ethyl ketone. The resulting composition had an acid value of 0. The results of three-point bending test and hot water-resistance test are shown in Table 1.

TABLE 1

| | | | Relative Breaking Strength in Bending | | | Hot Water-Resistance | | | | | |
|---|---|---|---|---|---|---|---|---|---|---|---|
| | | | | | | Relative Breaking Strength in Bending | | | Peeling Time (min) | | |
| Example No. | Flash Point | Emulsion Stability | Immediately After Prepn. | After 48 Hrs | After 192 Hrs | Immediately After Prepn. | After 48 Hrs | After 192 Hrs | Immediately After Prepn. | After 48 Hrs | After 192 Hrs |
| Example 1 | N.D.* | satisfactory for more than 6 months | 7.8 | 7.5 | 7.3 | 7.7 | 7.4 | 7.2 | >3000 | >3000 | >3000 |
| Compar. Example 1 | 170° C. or lower | | 7.7 | 1.3 | 1.0 | 7.6 | 1.2 | 1.0 | >3000 | >60 | >60 |

Note:
N.D.* means non-detected (hereinafter the same).

Comparative Example 2

A notched and coated glass plate sample was prepared in the same manner as in Example 1, except that PLURONIC F-108 (4 parts), Noigen EA-190D (2 parts), and ion-exchanged water (105 parts) were not used. The resulting composition had an acid value of 0. The results of three-point bending test and hot water-resistance test were substantially equal to those of Comparative Example 1.

EXAMPLE 2

Methacrylic acid (14.2 parts), acrylic acid (8.9 parts), stearyl methacrylate (9.5 parts), n-butyl acrylate (35.1 parts), ethyl acrylate (18.8 parts), and methyl methacrylate (13.5 parts) were copolymerized to prepare water-soluble acrylic polymer (1).

Curing composition (2) having the following composition was prepared as follows. To curing compounds (I) shown below were added dibutyltin dilaurate as a coupling agent catalyst and then the above-prepared water-soluble acrylic polymer (1). To the mixture was slowly added ion-exchanged water while stirring to conduct phase reversal to obtain a stable emulsion dispersion. Coupling agent (II) was then added to the emulsion dispersion.

Curing composition (2) had an acid value of 20.2.

| Composition of Curing Composition (2): | |
| --- | --- |
| Curing Compounds (I): | |
| I-16A | 40 parts |
| I-12A | 10 parts |
| I-9A | 10 parts |
| I-17A | 15 parts |
| I-19A | 15.9 parts |
| I-107A | 5 parts |
| II-13 | 5 parts |
| ACRONAL 4F | 0.1 part |
| VII-8 | 4 parts |
| Dibutyltin dilaurate | 0.05 part |
| water-soluble acrylic polymer (1) | 15 parts |
| Ion-exchanged water | 150 parts |

A notched and coated glass plate sample (flawable) was prepared by using curing composition (2) in the same manner as in Example 1, except that the step of drying the sample in an oven at 60° C. for 1 minute (maintenance under heat) was replaced by irradiation of the coated surface of the glass plate with far infrared rays for 5 seconds by means of a ceramics type coating type far infrared projector (manufactured by Teikoku Piston Ring Co., Ltd.; unit irradiation area: 13 cm×13 cm; 200 V; 0.4 kW; the number of unit irradiation areas was adjusted so as to make the total irradiation area at least three times the irradiated area of the sample) set to have an irradiation area surface temperature of 400° C. and placed at a distance of 10 cm from the coated surface of the glass plate. The results of three-point bending test and hot water-resistance test of the resulting sample are shown in Table 2 below.

Comparative Example 3

A notched and coated glass plate sample was prepared in the same manner as in Example 2, except for replacing water-soluble acrylic polymer (1) (15 parts) and ion-exchanged water (150 parts) with 165 parts of methyl ethyl ketone. The resulting composition had an acid value of 0. The results of three-point bending test and hot water-resistance test are shown in Table 2.

TABLE 2

| | | | Relative Breaking Strength in Bending | | | Hot Water-Resistance | | | | | |
| | | | | | | Relative Breaking Strength in Bending | | | Peeling Time (min) | | |
| Example No. | Flash Point | Emulsion Stability | Immediately After Prepn. | After 48 Hrs | After 192 Hrs | Immediately After Prepn. | After 48 Hrs | After 192 Hrs | Immediately After Prepn. | After 48 Hrs | After 192 Hrs |
| Example 2 | N.D. | satisfactory for more than 6 months | 6.9 | 6.9 | 6.9 | 6.9 | 6.9 | 6.9 | >3000 | >3000 | >3000 |
| Compar. Example 2 | −5° C. or less | | 5.8 | 1.6 | 1.4 | 5.3 | 1.1 | 1.0 | 600 | 60 | 60 |

EXAMPLE 3

Methacrylic acid (22.1 parts), stearyl methacrylate (14.5 parts), butyl acrylate (21.9 parts), perfluorooctylethyl acrylate (0.3 part), ethyl acrylate (24.4 parts), and methyl methacrylate (17.1 parts) were copolymerized to obtain water-soluble acrylic polymer (2). To the polymer was added 21 parts of 30% aqueous ammonia to have ammonia as a coupling agent catalyst supported on the polymer. The water-soluble acrylic polymer (2) having supported thereon ammonia had a pH of 7.

Curing composition (3) having the following composition was prepared as follows. To curing compounds (I) shown below was added the above-prepared water-soluble acrylic polymer (2) having supported thereon ammonia, and an emulsifying agent was then added thereto. To the mixture was added ion-exchanged water while stirring to conduct phase reversal to obtain a stable emulsion dispersion. Finally, coupling agent (II) was added thereto.

Curing composition (3) had an acid value of 16.7.

| Composition of Curing Composition (3): | |
| --- | --- |
| Curing Compounds (I): | |
| I-37A | 40 parts |
| I-46A | 10 parts |
| I-64A | 15 parts |
| I-77A | 10 parts |
| I-17A | 15 parts |
| I-107A | 10 parts |
| II-13 | 5 parts |
| ACRONAL 4F | 0.1 part |
| VII-8 | 4 parts |
| 30% Aqueous ammonia | 3.2 parts |
| Water-soluble acrylic polymer (2) | 15 parts |
| Emulsit 9 (polyoxyethylene alkylphenyl ether emulsifying agent (HLB: 18-20), produced by Dai-ichi Kogyo Seiyaku Co., Ltd.) | 2.0 parts |
| Ion-exchanged water | 150 parts |

A notched and coated glass plate sample was prepared by using curing composition (3) in the same manner as in Example 2. The results of three-point bending test and hot water-resistance test are shown in Table 3.

EXAMPLE 4

Curing composition (4) having the following composition was prepared as follows. To curing compounds (I) shown below were added coupling agent (II), an emulsifying agent, and water-soluble acrylic polymer (1) prepared in Example 2. To the mixture was slowly added ion-exchanged water while stirring to conduct phase reversal to obtain a stable emulsion dispersion. Finally, p-toluenesulfonic acid was added thereto as a coupling agent catalyst.

| Composition of Curing Composition (4): | |
|---|---|
| Curing Compounds (I): | |
| I-103A | 40 parts |
| I-125M | 35 parts |
| I-122M | 20 parts |
| II-13 | 5 parts |
| p-Toluenesulfonic acid.H$_2$O | 0.05 part |
| Water-soluble acrylic polymer (1) | 15 parts |
| Emulsit 9 | 2.0 parts |
| Ion-exchanged water | 150 parts |

Curing composition (4) was coated on a glass plate in the same manner as in Example 2. After maintaining the coated glass plate under heat with far infrared rays, 5 Mrad of electron rays (accelerating voltage: 300 kV; current: 25 mA; radiation dose rate: 30 Mrad/sec; O$_2$ concentration during irradiation: 0.1%) were irradiated on the coated surface to prepare a sample. The results of three-point bending test and hot water-resistance test are shown in Table 3.

position (3) prepared in Example 3 and then treated in the same manner as in Example 1 to prepare a sample having a 3 μm thick cured film on the outer surface thereof.

Fifty samples were subjected to pressure test and impact test according to the following test methods to obtain the minimum and average pressure resistance and impact strength. The results obtained are shown in Table 4. Measurements were made on samples coated with curing composition (3) immediately after the preparation and samples coated with curing composition (3) after being preserved for 192 hours from the preparation.

Pressure Test Method:

JIS-S-2302 "Inner pressure resistance test method of glass bottles for carbonated beverage". Samples suffering no breakage under a water inner pressure of 900 psi were judged to have a pressure resistance of 900 psi.

Impact Test: JIS-S-2303 "Mechanical impact test method of glass bottles for carbonated beverage".

TABLE 3

| | | | Relative Breaking Strength in Bending | | | Hot Water-Resistance | | | | | |
|---|---|---|---|---|---|---|---|---|---|---|---|
| | | | | | | Relative Breaking Strength in Bending | | | Peeling Time (min) | | |
| Example No. | Flash Point | Emulsion Stability | Immediately After Prepn. | After 48 Hrs | After 192 Hrs | Immediately After Prepn. | After 48 Hrs | After 192 Hrs | Immediately After Prepn. | After 48 Hrs | After 192 Hrs |
| Example 3 | N.D. | satisfactory for more than 6 months | 8.3 | 8.3 | 8.0 | 8.3 | 8.3 | 8.0 | >3000 | >3000 | >3000 |
| Example 4 | N.D. | satisfactory for more than 6 months | 4.4 | 4.4 | 4.4 | 4.4 | 4.4 | 4.4 | >3000 | >3000 | >3000 |

EXAMPLE 5

A commercially available flawable glass bottle (weight: 150 g; volume: 300 ml) was dip-coated with curing com-

TABLE 4

| | | Pressure Resistance (psi) | | | | Impact Strength (kg/cm) | | | |
|---|---|---|---|---|---|---|---|---|---|
| | | Immediately After Preparation | | After 192 Hrs. | | Immediately After Preparation | | After 192 Hrs. | |
| Flash Point | Emulsion Stability | Minimum | Average | Minimum | Average | Minimum | Average | Minimum | Average |
| N.D. | Stable for more than 6 months | 654 | 842 | 630 | 812 | 2.4 | 11.7 | 2.3 | 11.3 |

While the invention has been described in detail and with reference to specific examples thereof, it will be apparent to one skilled in the art that various changes and modifications can be made therein without departing from the spirit and scope thereof.

What is claimed is:

1. A curing composition for reinforcing an inorganic oxide material, comprising an α,β-ethylenically unsaturated compound and a coupling agent emulsified and dispersed in water, said coupling agent being selected from the group consisting of silane coupling agents, titanium coupling agents, aluminum coupling agents, zirconium coupling agents, and zirconium/aluminum coupling agents.

2. A curing composition as claimed in claim 1, wherein said curing compound is a compound having at least two acryloyl type groups selected from the group consisting of an acryloyl group, a methacryloyl group, and a fluoroacryloyl group in the molecule thereof.

3. A curing composition as claimed in claim 1, wherein said composition further contains an emulsifying agent.

4. A curing composition as claimed in claim 1, wherein said composition further contains a water-soluble high polymer.

5. A curing composition as claimed in claim 4, wherein said water-soluble high polymer is a water-soluble high polymer obtained by polymerizing a compound containing at least one acryloyl type group selected from the group consisting of an acryloyl group, a methacryloyl group, and a fluoroacryloyl group in the molecule thereof.

6. A curing composition as claimed in claim 5, wherein said compound containing at least one acryloyl type group further contains a carboxyl group.

7. A curing composition as claimed in claim 5, wherein said compound containing at least one acryloyl type group further contains an alkyl group having 6 or more carbon atoms.

8. A curing composition as claimed in claim 1, wherein said composition further contains a catalyst for the coupling agent.

9. A curing composition as claimed in claim 1, wherein said composition further contains an oil-soluble fluorine type surface active agent.

10. A curing composition as claimed in claim 1, wherein said composition has an acid value of from 0 to 40.

11. A curing composition for reinforcing a flawable base, comprising an α,β-ethylenically unsaturated compound and a coupling agent emulsified and dispersed in water, said coupling agent being selected from the group consisting of silane coupling agents, titanium coupling agents, aluminum coupling agents, zirconium coupling agents, and zirconium/aluminum coupling agents.

12. A process for reinforcing an inorganic oxide material comprising applying a curing composition comprising an α,β-ethylenically unsaturated compound and a coupling agent emulsified and dispersed in water on said inorganic oxide material, said coupling agent being selected from the group consisting of silane coupling agents, titanium coupling agents, aluminum coupling agents, zirconium coupling agents, and zirconium/aluminum coupling agents.

13. A process for reinforcing a flawable base comprising a curing composition comprising an α,β-ethylenically unsaturated compound and a coupling agent emulsified and dispersed in water on said flawable base, said coupling agent being selected from the group consisting of silane coupling agents, titanium coupling agents, aluminum coupling agents, zirconium coupling agents, and zirconium/aluminum coupling agents.

* * * * *